United States Patent [19]
Johnson

[11] Patent Number: 5,121,806
[45] Date of Patent: Jun. 16, 1992

[54] POWER WHEELCHAIR WITH TORSIONAL STABILITY SYSTEM

[76] Inventor: Richard N. Johnson, 484 Whistleberry Dr., Marstons Mills, Mass. 02648

[21] Appl. No.: 664,674

[22] Filed: Mar. 5, 1991

[51] Int. Cl.⁵ .............. B60L 11/18; B60K 1/00; B60G 11/20; B62K 11/64
[52] U.S. Cl. .................. 180/65.5; 180/68.5; 180/907; 280/112.2; 280/755; 280/788; 297/DIG. 4
[58] Field of Search ............ 280/250.1, 788, 111, 280/112.2, 755; 297/DIG. 4; 180/65.5, 65.1, 907, 68.5

[56] References Cited

U.S. PATENT DOCUMENTS

| | | | |
|---|---|---|---|
| 2,448,992 | 9/1948 | Love et al. | 180/65.1 |
| 3,387,681 | 6/1968 | Rabjohn | 180/65.5 |
| 3,583,727 | 6/1971 | Wallis | 280/112.2 |
| 3,797,600 | 3/1974 | Miner | 180/65.1 |
| 3,893,533 | 7/1975 | Tidwell | 280/112.2 |
| 3,917,312 | 11/1975 | Rodaway | 280/250.1 |
| 4,730,842 | 3/1988 | Summers et al. | 297/DIG. 4 |
| 4,750,578 | 6/1988 | Brandenfels | 180/907 |
| 4,798,255 | 1/1989 | Wu | 180/65.1 |
| 4,805,712 | 2/1989 | Singleton | 180/907 |
| 4,947,955 | 8/1990 | Hopely, Jr. | 180/907 |
| 5,029,894 | 7/1991 | Willman | 280/755 |

FOREIGN PATENT DOCUMENTS 594524 1/1978 Switzerland ............ 280/755

Primary Examiner—Andres Kashnikow
Assistant Examiner—Eric Culbreth
Attorney, Agent, or Firm—Parkhurst, Wendel & Rossi

[57] ABSTRACT

An improved power wheelchair is provided that provides exceptional maneuverability, stability and directional tracking characteristics. The wheelchair includes a torsional frame and a rigid stability frame. Two main wheels and a pivoting drive wheel are coupled to the torsional frame. At least two freely rotating casters are coupled to the stability frame. The torsional frame and stability frame interact to provide automatic compensation for directional tracking errors caused by shifts in the mass center of an occupant. The wheelchair can be equipped with either manual or power steering. A unique three-point battery mounting assembly also permits easy replacement of batteries.

15 Claims, 7 Drawing Sheets

POWER WHEELCHAIR WITH TORSIONAL STABILITY SYSTEM

TECHNICAL FIELD

The invention relates generally to power wheelchairs. More specifically, the invention relates to an improved power wheelchair with independent steering and power systems that incorporates a torsional frame in conjunction with a stability frame to provide both improved tracking and stability.

BACKGROUND ART

Conventional power wheelchairs, while vastly improving the quality of life for individuals with restricted mobility, have a number of deficiencies that limit their maneuverability and stability. U.S. Pat. No. 3,955,639 issued to Cragg on May 11, 1976, for example, discloses a typical conventional power wheelchair that employs dual electric motors coupled to fixed rear wheels and freely castering front wheels. Steering is accomplished by independently controlling motor velocity and direction of the dual electric motors to vary the force applied to the fixed rear wheels. The freely castering front wheels help to provide a small overall turning radius for the wheelchair. The use of the drive motors for both propulsion and steering in combination with the freely castering front wheels, however, results in poor directional tracking. In addition, the freely castering front wheels may also make the starting of movement difficult if the wheels are misaligned from the intended direction of motion, thereby making some maneuvers practically impossible in small confined spaces. Conventional wheelchairs also generally employ a rigid frame which can cause a wheel to loose ground contact on uneven surfaces. The loss of ground contact can cause instability that might result in the wheelchair tipping over. A more detailed discussion of conventional power wheelchair dynamics and the problems associated therewith is provided in an article entitled "Dynamic Modeling of an Electric Wheelchair", B. W. Johnson & J. H. Aylor, IEEE Transactions on Industry Applications, Vol 1A-21, No. 5, 1985.

Three-wheel personal mobility vehicles or scooters have more recently become a popular replacement for conventional wheelchairs for many individuals with limited mobility. See, for example, U.S. Pat. No. 4,570,739 issued to Kramer on Feb. 18, 1986. The personal mobility vehicles or scooters generally resemble downsized golf carts with a single manually steerable front wheel and two fixed rear wheels. The track of the rear wheels of such vehicles is generally narrower and the wheelbase is generally longer than that of conventional wheelchairs. While such vehicles provide some advantages over conventional wheelchairs, the scooters do not maneuver as well as the typical wheelchair due to their longer wheelbase. The scooters also have disadvantages of their own, including susceptibility to side-to-side tipover due to the small diameter wheels that are generally employed in their manufacture. In addition, the difficulty in entering and exiting the scooter and the lack of power steering has limited the use of scooters to less impaired individuals. In fact, many individuals with progressive diseases that start out using a scooter have to resort to using a conventional power wheelchair—with all of its inherent disadvantages—in the latter stages of their disease, due to the limitations of the scooters discussed above.

The undesirable tracking and stability characteristics of conventional wheelchairs and scooters is further compounded by the fact that such devices are usually designed to be lightweight in order to permit easy handling and storage. As a result, the mass of the occupant equals or exceeds the mass of the wheelchair or scooter in most cases. Thus, movements by the occupant that shift the mass center of the occupant can greatly impact the stability and directional tracking of the wheelchair or scooter.

In view of the above, it is an object of the present invention to provide a power wheelchair that overcomes the disadvantages associated with conventional wheelchairs and scooters. It is a further object of the invention to provide a power wheelchair that compensates for the movement of an occupant, such that the movement of an occupant does not adversely impact the stability and directional tracking of the wheelchair.

SUMMARY OF THE INVENTION

The invention provides a power wheelchair with improved maneuverability, directional tracking and stability characteristics. More specifically, a power wheelchair is provided that includes a torsional frame that provides torsion in a vertical plane of the torsional frame; a pivot wheel assembly and two main wheels coupled to the torsional frame in a triangular configuration; a substantially rigid stability frame coupled to the torsional frame; and at least two freely rotating stability casters adjustably coupled to the stability frame; wherein the stability casters are located on opposite sides of the pivot wheel assembly.

The overall construction of the power wheelchair provides many advantages over conventional power wheelchairs and scooters. The combination of the two main wheels, the pivot wheel assembly and the stability casters provides a highly stable vehicle even when moving over uneven surfaces. The torsional frame and stability frame also act in unison to compensate for directional tracking problems associated with a shift in the mass center of an occupant.

BRIEF DESCRIPTION OF THE DRAWINGS

With the above as background, reference should now be made to the following detailed description of the preferred embodiment of the invention and the accompanying drawings in which.

DETAILED DESCRIPTION OF PREFERRED EMBODIMENT

The present invention overcomes the disadvantages associated with conventional power wheelchairs and scooters by providing a power wheelchair that incorporates a torsional frame in combination with a rigid stability frame. As will be discussed in greater detail below, the torsional frame includes torsion elements that flex or twist about their longitudinal axes to compensate for shifts in the mass center of an occupant, thereby preventing the shift in the occupant's mass from adversely impacting the stability of the wheelchair. The rigid stability frame includes freely rotating caster wheels mounted thereon that come in rigid contact with the ground when the shift in the occupants mass center reaches a point that could cause instability of the wheelchair. The torsional frame and stability frame also act together to automatically compensate for directional tracking errors caused by a shift in the mass center of the occupant.

Figure 1:
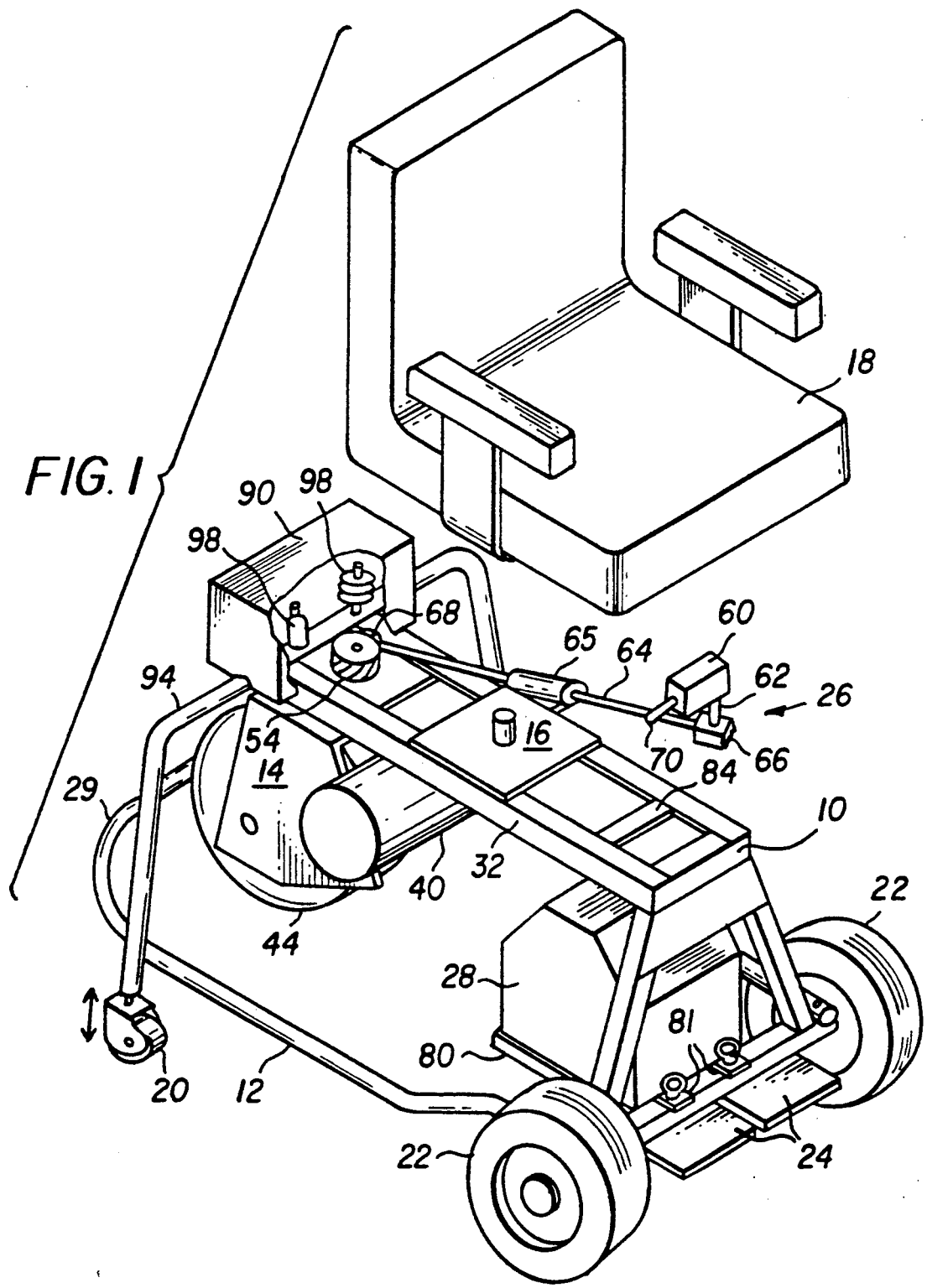
FIG. 1 is a perspective view of a preferred embodiment of a wheelchair in accordance with the present invention.

Referring now to FIG. 1, a preferred embodiment of a power wheelchair in accordance with the present invention is shown including a torsional frame 10, a stability frame 12, a pivot wheel assembly 14, a seat mounting bracket 16, a seat 18 configured to be releasably mounted to the seat mounting bracket 16; two freely rotating stability casters 20 coupled to the stability frame 12 on opposite sides of the pivot wheel assembly 14; two main wheels 22 mounted to an axle (not shown) that is supported by the torsional frame 10; a footrest 24 releasably coupled to the torsional frame 10; a manual steering control arm 26; and a battery mounting assembly 28. A flexible bumper 29 is preferably provided to protect the wheelchair from damage due to collisions when moving in the reverse direction. Alternatively, the bumper 29 can form part of the stability frame 12. The seat 18 is preferably mounted to the seat mounting bracket 16 via a steel pin that is spring loaded to absorb shock and that permits the seat 18 to swivel 360 degrees. A swivel lock (not shown) is provided, however, to lock the seat 18 in position when the wheelchair is in motion.

Figure 2:
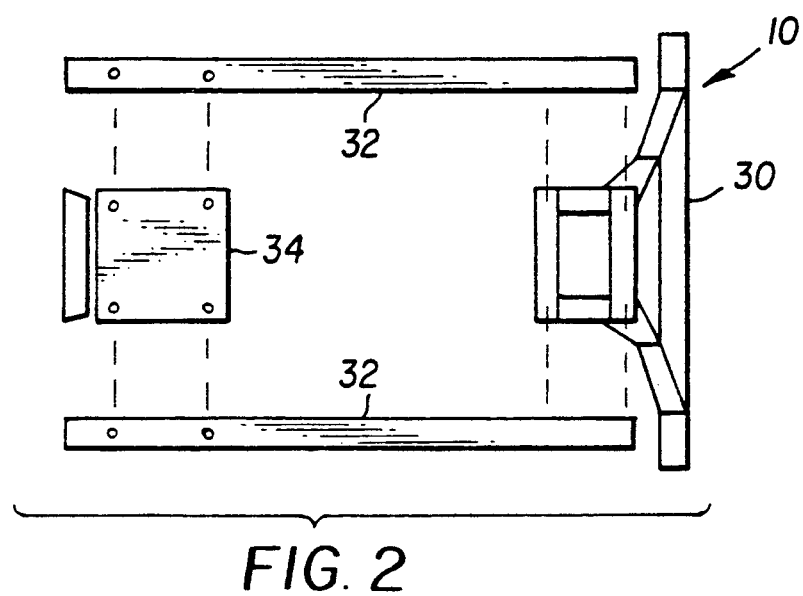
FIG. 2 is an exploded view of a torsional frame employed in the wheelchair illustrated in FIG. 1.

As is more clearly illustrated in FIG. 2, the torsional frame 10 includes a rigid front frame 30, two torsion elements 32 having front portions attached to the top of the rigid front frame 30, and a pivot wheel assembly mounting bracket 34 that attaches to the rear portions of the torsion elements 32. The torsional elements 32 are preferably "L" shaped elastic members (See FIG. 3) that twist easily in the vertical plane while providing high load capability. The torsional elements 32 can be formed of spring steel or elastic composite materials.

Figure 3:
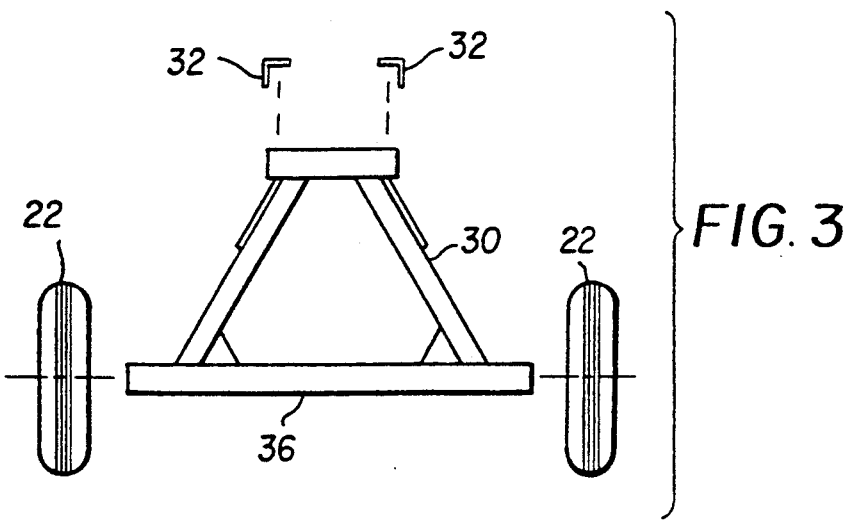
FIG. 3 is a front view of the torsional frame illustrated in FIG. 2.
Figure 4:
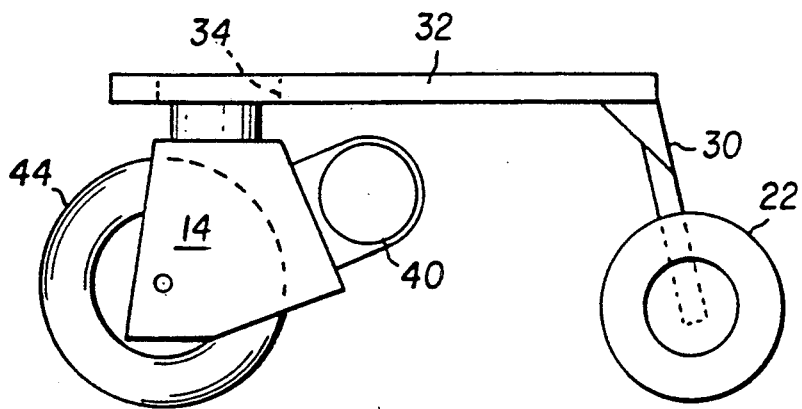
FIG. 4 is a side view of the torsional frame illustrated in FIG. 2 with a pivot wheel assembly attached thereto.

As shown in FIGS. 3 and 4, the pivot wheel assembly 14 attaches to the pivot wheel assembly mounting bracket 34 and the front wheels 22 are attached to the axle (not shown) that runs through a lower frame member 36—preferably a square tube—of the rigid front frame 30. The pivot wheel assembly 14, shown in greater detail in FIGS. 5 and 6, includes an electric motor 40, preferably a high torque, low RPM, reversible permanent magnet DC motor (for example, a Series No. 4050 motor available from MagneTek, El Paso, Tex., that is modified to operate on 12 volts and produce 440 oz-inches of torque at 600 RPM), mounted on a support frame 42 of high thermal conductivity that also serves as a heat sink for the electric motor, a pivot wheel 44 coupled to a clutch and brake assembly 46, a drive belt 48 coupling the electric motor 40 to the clutch and brake assembly 46, and a tension pulley 50 that permits the tension on the drive belt 48 to be adjusted. The pivot wheel 44 has caster, i.e., the angle by which the steering axis deviates from the vertical, which tends to center the pivot wheel 44 during forward travel of the wheelchair when power is not applied to the motor 40. The support frame 42 is coupled to a bearing 49 which permits rotation of the pivot wheel 44. Position stops 51 and 52 are respectively provided on the support frame 42 and the torsion frame elements 32, however, to limit the rotation of the pivot wheel 44 to a total of 180 degrees (90 degrees on either side from center). A steering gear 54, located above the pivot wheel assembly mounting bracket 34, is coupled to the support frame 42 via the bearing 49, such that rotation of the steering gear 54 causes the pivot wheel assembly 14 to rotate.

Figure 7:
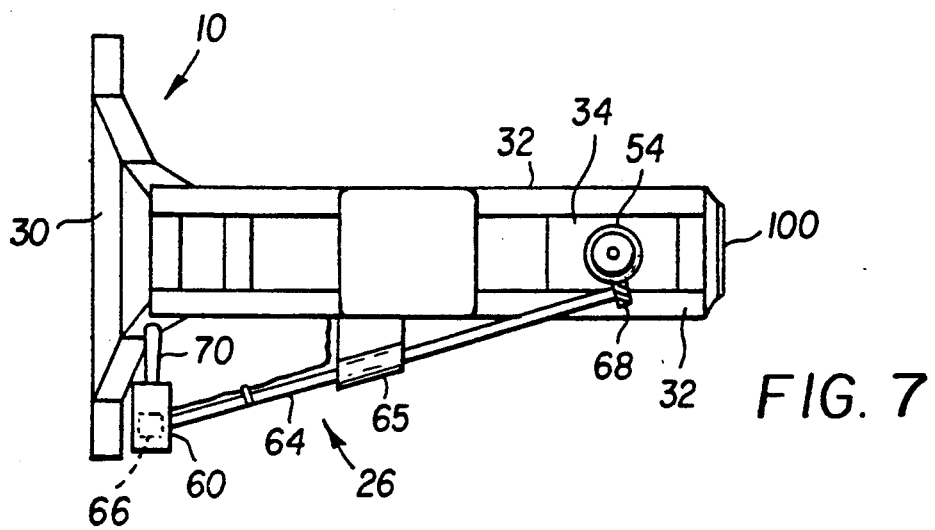
FIG. 7 illustrates the attachment of a manual control arm to the torsional frame illustrated in FIG. 3.

The manual steering control arm 26 is also attached to the torsion frame 10 as shown in FIG. 7. The manual steering control arm 26 includes a handgrip controller unit 60 coupled to a vertical control arm 62 (See FIG. 1). The vertical control arm 62 is coupled to a horizontal control arm 64 via a 90 degree gearbox assembly 66. A control gear 68, which meshes with the steering gear 54, is attached to the end of the horizontal control arm 64. The horizontal control arm 54 passes through a frictional steering damper 65 that provides a uniform load on the steering mechanism. Rotational movement of the handgrip controller unit 60 in the horizontal plane causes the vertical control arm 62 to rotate. The rotation of the vertical control arm 62 causes the horizontal control arm 64 to rotate, which in turn causes the control gear 68 to rotate. Rotation of the control gear 68 causes the steering gear 54 to rotate, thereby moving the pivot wheel assembly 14.

Figure 5:
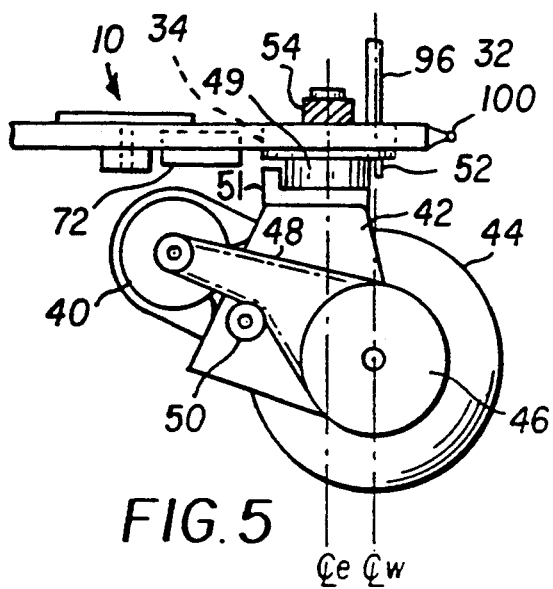
FIG. 5 is a detailed side view of the pivot wheel assembly employed in the wheelchair illustrated in FIG. 1.
Figure 6:
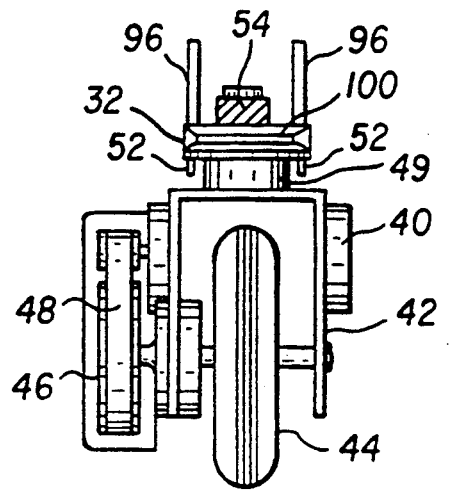
FIG. 6 is a back view of the pivot wheel assembly illustrated in FIG. 5.

The handgrip controller unit 60 includes a rotating handgrip speed control 70 that is coupled to a drive motor controller 72 located on the torsion frame 10 (See FIG. 5). The drive motor controller 72 controls the operation of the electric motor 40 in response to a drive signal that is received from the handgrip controller unit 60. More specifically, the direction of travel is controlled based on the direction of rotation of the handgrip speed control 70 and motor speed is controlled based on the degree of rotation of the handgrip speed control 70.

Figure 8:
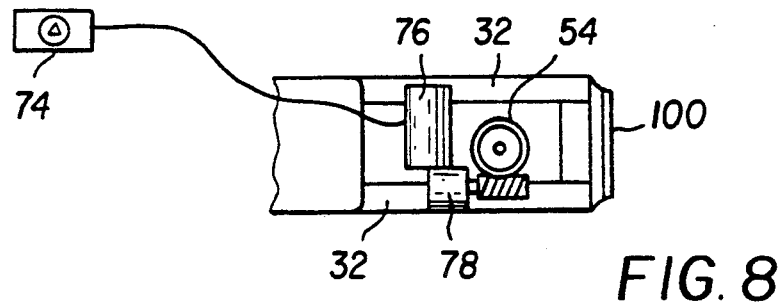
FIG. 8 illustrates a power steering unit for the wheelchair illustrated in FIG. 1.

An optional power steering embodiment is illustrated in FIG. 8. A joystick controller 74 is coupled to a steering motor controller 76 and the drive motor controller 72. The steering motor controller 76 controls the operation of a steering motor 78, which is coupled to the steering gear 54, in response to signals received from the joystick controller 74. The drive motor controller 72 also controls the speed and direction of operation of the electric motor 40 in response to signals received from the joystick controller 74.

Figure 9:
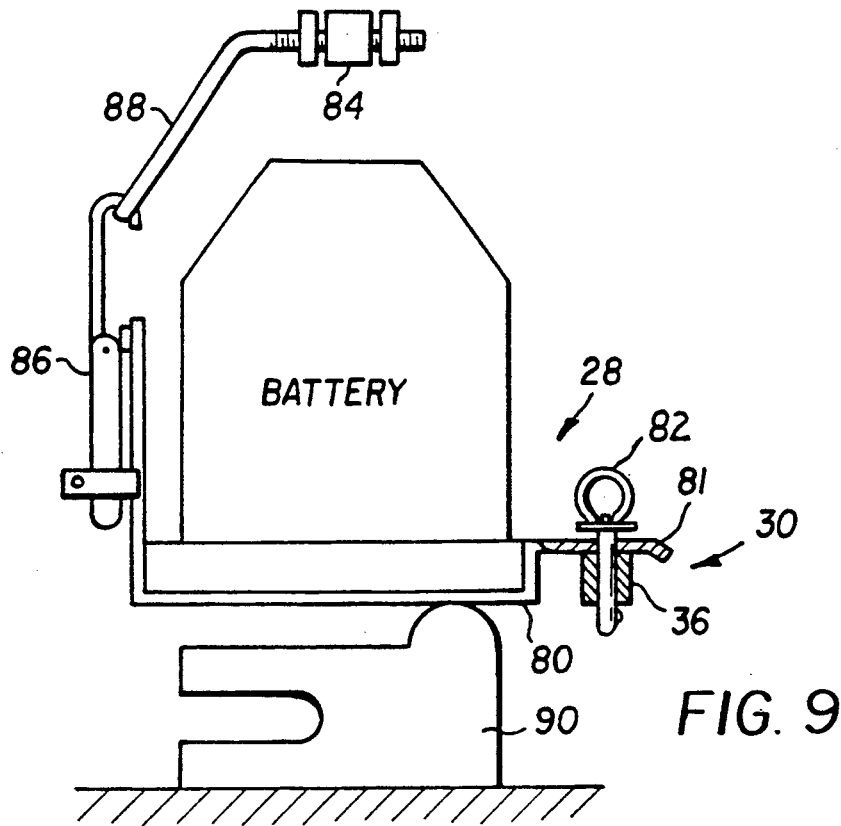
FIG. 9 illustrates a side view of a battery mounting assembly for the wheelchair illustrated in FIG. 1.
Figure 10:
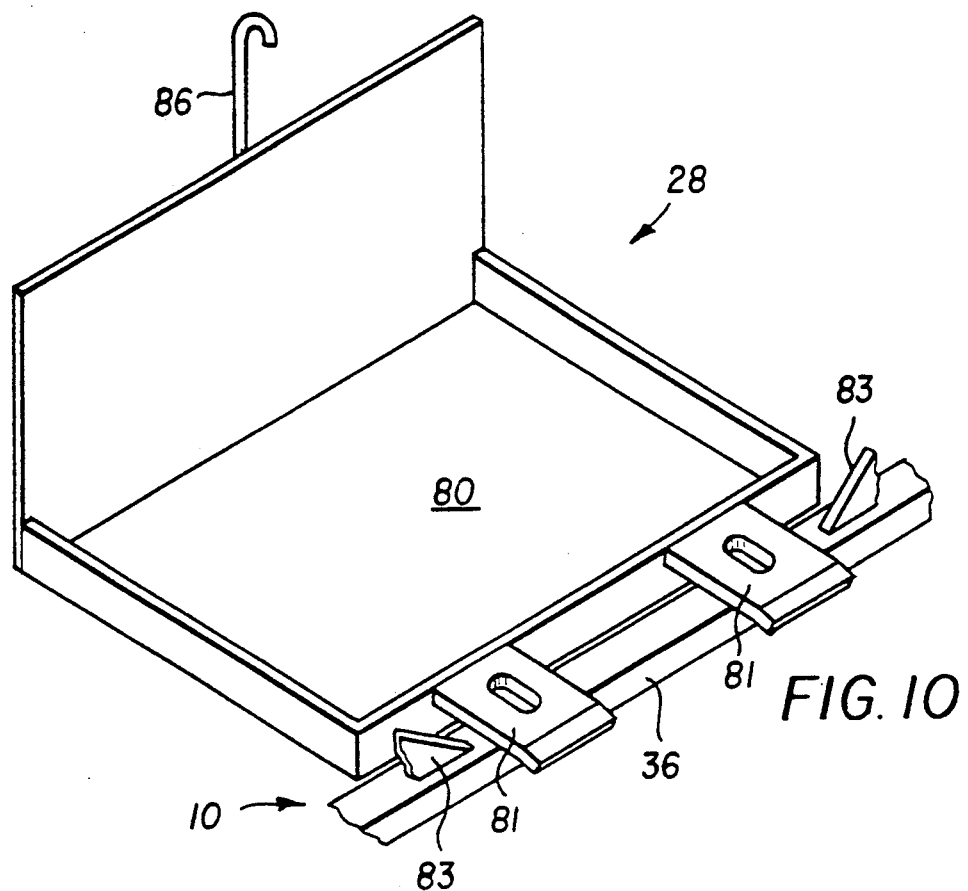
FIG. 10 is a perspective view of a battery box of the battery mounting assembly illustrated in FIG. 9.

The electric motor 40 and the optional steering motor 78 are powered by a battery (Gel/Cell or deep-cycle marine batteries Groups 24, 27, 29 with 24 inch wide track or Group 4 battery with 28 inch wide track) held in the battery mounting assembly 28. As shown in FIGS. 9 and 10, the battery mounting assembly 28 includes a battery box 80 that is attached to the lower frame member 36 of the rigid front frame 30 via quick release ball lock pins 82 and to an upper frame member 84 of the front frame 30 via a latch action drawing clamp 86 and connector rod 88. The unique construction of the battery mounting assembly 28 permits the battery box 80 to pivot and drop one to two inches onto a platform 90 when clamp 86 is released. The pivoting action of battery box 80 onto platform 90 moves the battery box 80 mounting tabs 81 away from frame member 36. The rear portion of the wheelchair can then be tilted upward and the wheelchair wheeled away from the battery box 80 on the two main wheels, thereby greatly simplifying the battery removal and replacement process. In addition, the three-point mounting of battery assembly 28 places the weight of the battery on frame member 36 to aid in keeping the front wheels in ground contact while latch action drawing clamp 86 and connector rod 88 allow torsion frame 10 to freely twist. During reinstallation of the battery, the mounting tabs 81 on battery box 80 and reinforcing angles 83 on frame member 36, as well as connector rod 88, correctly position the battery assembly 28 with respect to torsional frame 10 prior to the latching of drawing clamp 86.

Figure 11:
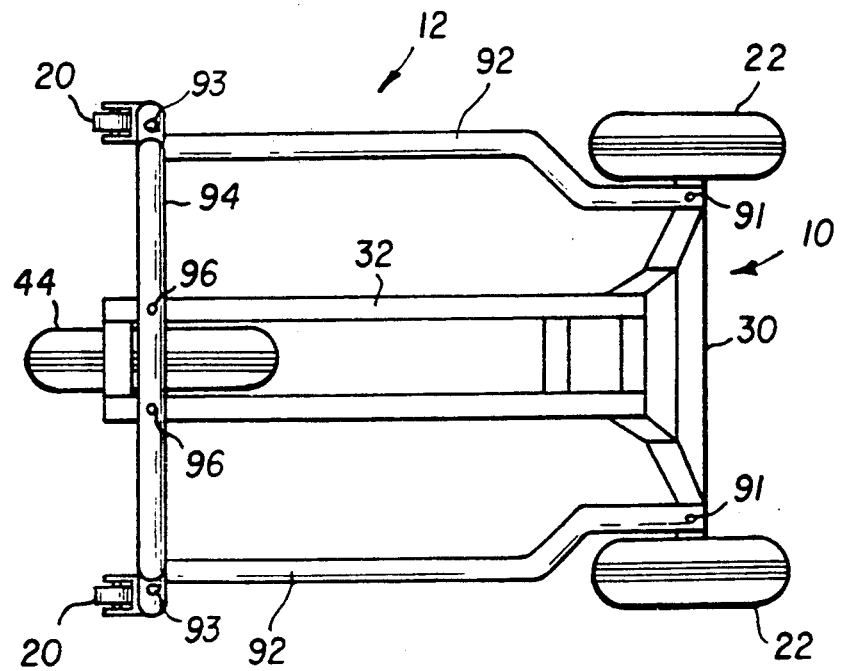
FIG. 11 is a top view of a stability frame attached to the torsional frame illustrated in FIG. 2.

The attachment of the stability frame 12 to the torsion frame 10 will now be described with reference to FIGS. 11-13. The stability frame 12 includes two rigid horizontal stability members 92 preferably attached via vertical pins 91 to the front frame 30 of the torsion frame 10 as shown in FIG. 10 and connected to a vertical stability member 94 with pivot connections 93 as shown in FIG. 11. The pivotal connection of the horizontal stability members 92 to the vertical stability member 94 permits the stability frame 12 to be folded substantially flat when it is removed from the torsional frame 10. The vertical stability member 94 fits over two elastic rods 96 mounted on the torsion elements 32 of the torsion frame 10 (See FIGS. 5 and 6). Force adjuster mechanisms 98, illustrated in FIG. 12, hold the vertical stability member 94 in place over the elastic rods 96 and also control the amount of twist or shift of the torsional frame 10 that is permitted, as will be described in greater detail below. The freely rotating stability casters 20 are adjustably mounted to the end portions of the vertical stability member 94 such that an adjustable gap of between $\frac{1}{8}$-$1\frac{1}{2}$ inches can be provided between the stability casters 20 and the floor surface. The vertical stability member 94 is also shaped to provide the stability casters 20 with a negative camber (angle $\phi$ illustrated in FIG. 12) so that the stability casters 20 are effectively pointing outward when the wheelchair is stationary and loaded. The vertical stability frame member 94 is directly aligned with the axle of the pivot wheel 44 when the pivot wheel 44 is centered as shown in FIG. 13. No interference occurs when the pivot wheel 44 is driven off a step or curb during normal activities as the stability casters 20 and pivot wheel 44 are sized so that the outer circumference of the stability casters 20 stays within the outer circumference of the pivot wheel 44.

Figure 12:
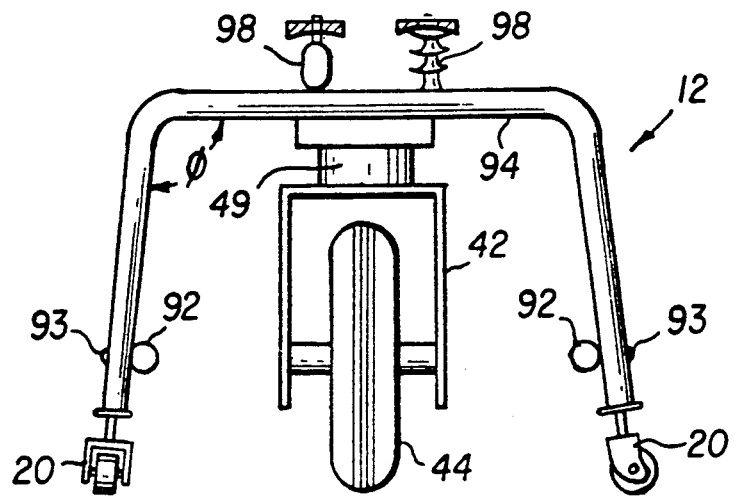
FIG. 12 is a back view of the stability frame illustrated in FIG. 11.
Figure 13:
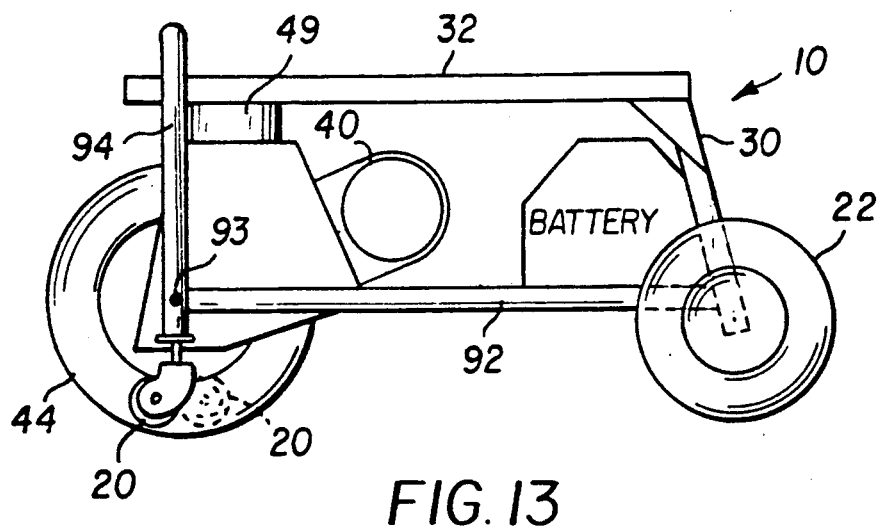
FIG. 13 is a side view of the stability frame illustrated in FIG. 11.
Figure 14:
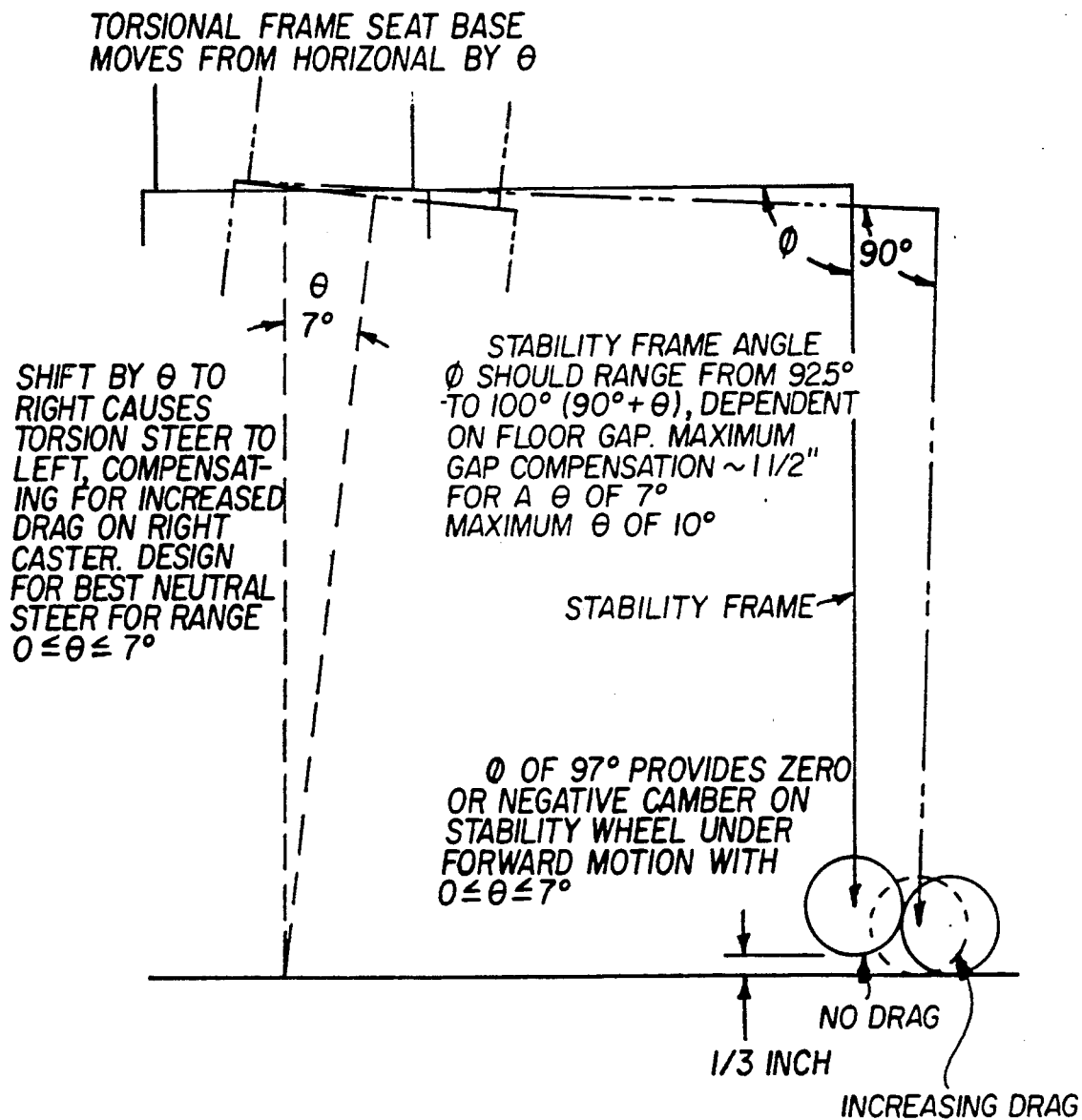
FIG. 14 is a diagram illustrating the geometrical relationship between the torsional frame and the stability frame.

The force adjuster mechanisms 98 can take the form of an elastomeric "spring" or a coil spring, as illustrated in FIG. 12, and are used to control how far the torsion frame 10 can twist off center. More specifically, as illustrated in FIG. 14, the angle $\theta$ represents the amount of twist or shift off center of the torsional frame 10. It should be noted that a shift in the mass center of the occupant to the right results in a twist in the torsional frame 10 such that the right front wheel is pushed forward and the left front wheel is pulled back. Thus, the torsion or twist would cause the wheelchair to turn to the left when the mass center of the occupant shifts to the right. The shift in mass, however, causes the stability caster 20 on the right side of the wheelchair to contact the surface of the floor, thereby increasing the drag on the right side stability caster, which compensates for the affect of the twist of the torsional frame, i.e., the increased drag due to the stability caster 20 essentially counteracts the torsion induced turn and pulls the wheelchair back to the center. The torsional frame and stability frame therefore work in unison to automatically compensate for shifts in the mass center of the occupant while the wheelchair is in motion.

The wheelchair can be adjusted for best dynamic performance on either smooth or uneven surfaces. The angle $\phi$ of vertical stability member 94 (FIG. 12) is preset and should preferably equal 90° plus the maximum desired torsion from shift angle $\theta$ (FIG. 14). The maximum value of angle $\theta$ is adjusted by the force adjuster mechanisms 98 and the height adjustment (i.e., floor gap) on stability casters 20. If angle $\phi$ is set to 100°, then the maximum allowed value of angle $\theta$ is 10° and the typical floor gap can be adjusted from $\frac{1}{8}$" to $1\frac{1}{2}$". The maximum floor gap of $1\frac{1}{2}$" would be set via adjusting casters 20 for operation over uneven surfaces. The twisting of the torsional frame by angle $\theta$ results in the seat mounting bracket 16 and the seat 18 shifting by $\theta$ from the horizontal. Thus, seat movement from the horizontal, whether induced by movement of the chair over an uneven surface or by the occupant shifting within the seat, results in a changing of the pressure points between the seat and the occupant. In addition, seat movement from the horizontal reduces the distance from the seat edge to the floor, facilitating the picking up of floor objects by the occupant.

The overall construction of the wheelchair provides many advantages over conventional wheelchairs and scooters. The combination of the two main wheels 22, the pivot wheel 44, and the stability casters 20 provides a highly maneuverable and stable vehicle even when moving over uneven surfaces. The combination of the torsional frame 10 and stability frame 12 compensates for directional tracking problems associated with a shift in the mass center of an occupant. The electrical motor 40 used for propulsion and the steering motor 76 (or manual steering) function independently. The high torque, low RPM, characteristics of the electrical motor 40 also permit a simple single drive belt and tensioner system to be utilized. The short wheelbase obtained by the underseat location of the pivot wheel assembly 14 provides for a high degree of maneuverability. The high attachment of the vertical stability member 94 to the torsional frame 10 via elastic rods 96 gives the equivalent stability of the large rear wheels associated with traditional wheelchairs. Thus, the small diameter stability casters 20 provide the side-to-side tipover resistance of large diameter wheels with an axle at the same height as the top horizontal element of the stability member 94. The unique battery mounting assembly permits easy replacement of batteries, as the battery essentially drops out of the bottom of the wheelchair. It should be noted that a handle 100 (See FIG. 5) can be provided on the rear of the torsional frame 10 to aid in tilting the wheelchair during battery removal. The platform 90 onto which the battery is lowered can also serve as a cover for the force adjusters 98 as illustrated in FIG. 1. Finally, the wheelchair can also be easily broken down into component parts for transportation and storage.

The invention has been described with reference to certain preferred embodiments thereof. It will be understood, however, that modifications and variations are possible within the scope of the appended claims. For example, the force adjusters 98 can be composed of leaf springs instead of the elastomeric spring and coil spring illustrated in FIG. 12. The structural elements of the torsional frame 10 and stability frame 12 may also be composed of different materials as long as they perform the specified functions. It should also be noted that while the front of the wheelchair has been defined as having the two main wheels 22, the wheelchair can also be operated in a manner such that the front of the wheelchair is defined as having the pivot wheel assembly 14.

What is claimed is:

1. A power wheelchair comprising: a torsional frame including flexible torsion elements that provide torsion in a vertical plane of the torsional frame; a pivot wheel assembly and two main wheels coupled to the torsional frame in a substantially triangular configuration; a substantially rigid stability frame coupled to the torsional frame; at least two freely rotating stability casters coupled to the stability frame and located on opposite sides of the pivot wheel assembly; and means for mounting a seat to the torsional frame;
    wherein the torsional frame includes a front frame having a lower member that supports an axle on which the main wheels are mounted and an upper member to which forward portions of the torsional elements are connected; and wherein rear portions of the torsional elements are coupled to a pivot wheel assembly mounting bracket to which the pivot wheel assembly is pivotally mounted.

2. A power wheelchair as claimed in claim 1, wherein the stability frame includes two horizontal stability members coupled to the lower member of the front frame and to a vertical stability member on which the stability casters are mounted.

3. A power wheelchair as claimed in claim 2, wherein the two horizontal stability members are releasably coupled to the lower member of the front frame and pivotally coupled to the vertical stability member.

4. A power wheelchair as claimed in claim 2, wherein the vertical stability member is shaped to provide the stability casters with a negative camber so that the stability casters are effectively pointing outward when the wheelchair is stationary and loaded.

5. A power wheelchair as claimed in claim 2, further comprising vertical elastic rods attached to the rear portions of the torsion elements, wherein the vertical stability member is mounted over and located by the elastic rods.

6. A power wheelchair as claimed in claim 5, further comprising force adjusters located on the elastic rods, wherein the force adjusters apply a retaining force to the vertical stability member.

7. A powered wheelchair as claimed in claim 6, wherein the force adjusters comprise elastomeric springs.

8. A power wheelchair as claimed in claim 6, wherein the force adjusters comprise coil springs.

9. A power wheelchair as claimed in claim 1, wherein the stability casters are adjustable to provide a variable floor gap.

10. A power wheelchair as claimed in claim 1, further comprising a battery mounting assembly releasably coupled to the torsional frame, wherein the battery mounting assembly lowers a battery retained therein out of the bottom of the wheelchair when the battery mounting assembly is released from the torsional frame.

11. A power wheelchair as claimed in claim 1, wherein the pivot wheel assembly includes a high torque, low RPM, reversible DC motor, mounted to a support frame having a high thermal conductivity, and wherein the support frame acts as a heat sink for the motor.

12. A power wheelchair as claimed in claim 1, further comprising a battery mounting assembly releasably coupled at two points to the lower member of the front frame and at one point to the upper member of the front frame.

13. A power wheelchair as claimed in claim 1, further comprising steering means for steering the pivot wheel assembly.

14. A power wheelchair as claimed in claim 13, wherein the steering means includes a manual steering control mechanism.

15. A power wheelchair as claimed in claim 13, wherein the steering means includes a power steering control mechanism.

* * * * *